US011556515B2

(12) United States Patent
Carroll et al.

(10) Patent No.: US 11,556,515 B2
(45) Date of Patent: *Jan. 17, 2023

(54) ARTIFICIALLY-INTELLIGENT, CONTINUOUSLY-UPDATING, CENTRALIZED-DATABASE-IDENTIFIER REPOSITORY SYSTEM

(71) Applicant: Bank of America Corporation, Charlotte, NC (US)

(72) Inventors: Matthew E. Carroll, Charlotte, NC (US); Manu Kurian, Dallas, TX (US); Aaron E. Russell, Virginia Beach, VA (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/404,047

(22) Filed: Aug. 17, 2021

(65) Prior Publication Data
US 2021/0374117 A1    Dec. 2, 2021

Related U.S. Application Data

(63) Continuation of application No. 16/406,188, filed on May 8, 2019, now Pat. No. 11,113,258.

(51) Int. Cl.
*G06F 16/22*      (2019.01)
*G06F 16/25*      (2019.01)
*G06F 16/2457*    (2019.01)
*G06F 16/21*      (2019.01)

(52) U.S. Cl.
CPC ........ *G06F 16/2282* (2019.01); *G06F 16/217* (2019.01); *G06F 16/24578* (2019.01); *G06F 16/254* (2019.01)

(58) Field of Classification Search
CPC .. G06F 16/27; G06F 16/283; G06F 16/24556; G06F 16/2282; G06F 16/245; G06F 16/2365; G06F 16/273; G06F 16/24578
USPC ................................................. 707/609, 610
See application file for complete search history.

(56) References Cited

U.S. PATENT DOCUMENTS

| | | | |
|---|---|---|---|
| 6,381,601 B1* | 4/2002 | Fujiwara | G06F 16/24556 711/216 |
| 6,523,041 B1 | 2/2003 | Morgan et al. | |
| 6,839,843 B1 | 1/2005 | Bacha et al. | |
| 7,096,354 B2 | 8/2006 | Wheeler et al. | |
| 7,676,489 B2 | 3/2010 | Kaiser | |

(Continued)

*Primary Examiner* — Robert W Beausoliel, Jr.
*Assistant Examiner* — Pedro J Santos
(74) *Attorney, Agent, or Firm* — Weiss & Arons LLP

(57) ABSTRACT

A centralized database identifier repository may identify databases using a unique identifier, or key tag, for each database. Each identified database may include data relating to one or more specific data elements. The repository may include a variety of data elements. Each data element may be associated with one or more database keys. The repository may be a repository of reference pointers. The repository may facilitate data viewing and data retrieval. A requestor may search for a data element using the centralized repository. The repository may retrieve data relating to a specific data element, from all databases identified by unique identifiers, that include data relating to the data element. The databases' unique identifiers may be encrypted tokens.

7 Claims, 5 Drawing Sheets

(56) References Cited

U.S. PATENT DOCUMENTS

| | | |
|---|---|---|
| 7,707,549 B2 | 4/2010 | Chudukatil et al. |
| 7,730,065 B2 | 6/2010 | Fisher et al. |
| 8,135,995 B2 | 3/2012 | Ngai et al. |
| 8,185,534 B1 | 5/2012 | Singhal et al. |
| 8,352,746 B2 | 1/2013 | Jonas |
| 8,392,439 B2 | 3/2013 | Bodamer et al. |
| 9,129,000 B2 | 9/2015 | Bommireddipalli et al. |
| 9,135,263 B2 | 9/2015 | Fox |
| 9,177,175 B2 | 11/2015 | Margolus et al. |
| 9,202,086 B1 | 12/2015 | Mattsson et al. |
| 9,722,777 B2 | 8/2017 | Payton et al. |
| 10,678,436 B1 | 6/2020 | Jiang et al. |
| 2011/0066601 A1* | 3/2011 | Rieger ............... G06F 16/2365 707/690 |
| 2014/0114818 A1 | 4/2014 | Olsen et al. |
| 2017/0083415 A1 | 3/2017 | Reza et al. |
| 2017/0116298 A1* | 4/2017 | Ravipati ............... G06F 16/13 |
| 2017/0286518 A1 | 10/2017 | Horowitz et al. |
| 2020/0065297 A1 | 2/2020 | Taylor et al. |

\* cited by examiner

ARTIFICIALLY-INTELLIGENT, CONTINUOUSLY-UPDATING, CENTRALIZED-DATABASE-IDENTIFIER REPOSITORY SYSTEM

CROSS-REFERENCE TO RELATED APPLICATION

This application is a continuation of U.S. patent application Ser. No. 16/406,188 filed on May 8, 2019, now U.S. Pat. No. 11,113,258, and entitled "ARTIFICIALLY-INTELLIGENT, CONTINUOUSLY-UPDATING, CENTRALIZED-DATABASE-IDENTIFIER REPOSITORY SYSTEM" which is hereby incorporated by reference herein in its entirety.

FIELD OF TECHNOLOGY

This disclosure relates to system that utilize database identifiers.

BACKGROUND

Large entities may include multiple lines of business ("LOB"). Each LOB may host one or more databases. For a variety of reasons, communication between disparate LOB databases may be limited. Because little communication exists between the LOB databases, it is not uncommon for duplicative data to be found throughout multiple databases associated with a single entity.

Duplicative data, or multiple instances of the same data element, may be damaging to an entity for numerous reasons. Firstly, duplicative data wastes time, effort, energy and resources used to maintain the data in more than one location. Secondly, duplicative data may cause data inconsistencies, because the data may be updated in one location and not updated in another location. Thirdly, duplicative data slows the processing of a system because the system has to review, and sometimes, traverse multiple copies of the same data element.

Therefore, it would be desirable to create a system that identifies duplicative data among a plurality of databases. It would be further desirable for the system to consolidate multiple instances of the same data.

SUMMARY OF THE DISCLOSURE

An artificially-intelligent, continuously-updating, centralized database identifier repository system is provided. The system may include an artificial intelligence module.

The artificial intelligence module may be operable to review a plurality of databases. Each database included in the plurality of databases may include one or more tables. The review by the artificial intelligence module may be used to seek out and determine the existence of multiple particulars, redundancies and/or fact patterns within the plurality of databases.

One particular may include determining duplicate records within the plurality of databases. Another particular may include determining comparable records within the plurality of databases. It should be appreciated that comparable records may be similar to one another. An example of similar records may be two records that include approximately 75% of the same data and 25% different data. Another example of similar records may be two records that include approximately 90% of the same data and 10% different data.

Another particular may include determining a utilization metric for a table included within the plurality of databases. The utilization metric may identify how often the table is used.

Based on the review, the artificial intelligence module may identify one or more recommendations for database synchronization and/or database usage optimization. The recommendations may include removing duplicate entries. The recommendations may include consolidating tables. The recommendations may include consolidating databases.

The recommendations may include maintaining data references within certain tables to other tables. For example, a first data element from a first table in a first database may be duplicative of a second data element from a second table in a second database. The recommendation may include, upon receipt of confirmation of redundancy between the first data element and the second data element, deleting the second data element from the second table in the second database and replacing the second data element from the second table in the second database with a reference to the first data element in the first table in the first database. Maintaining the data reference may ensure that the second database retains access to the data. Maintaining the data reference, and only maintaining the data element in one database, may also ensure that the data remains consistent across multiple databases.

Recommendations for database usage optimization according to the embodiments may include archiving unused tables or databases, placing tables used at a high frequency in priority memory locations, deactivating legacy databases and any other database usage optimization. Tables and/or databases that are determined to be utilized less than a second threshold frequency may be deactivated, archived or deleted.

Based on the review, the artificial intelligence module may rank the tables included in the plurality of databases based on the utilization metric. More frequently used tables may receive a higher ranking and less frequently used tables may receive a lower ranking.

Based on the review, the artificial intelligence module may determine and assign memory locations for each table and/or database. The memory locations may include a plurality of memory locations with shorter than a threshold response time. The memory locations may also include a plurality of memory locations with greater than a threshold response time. Tables and/or databases with usage that is greater than a threshold frequency may be assigned to memory locations with shorter than the threshold response time. Tables and/or databases with usage that is lower than a threshold frequency may be assigned to memory locations with greater than a threshold response time.

The system may include a display module. The display module may be configured to display the recommendations to an operator. The display module may be configured to instruct the system to execute the recommendations upon receipt of operator confirmation.

The system may continuously re-review the plurality of databases in order to identify one or more recommendations after a predetermined time period. The system may continually or substantially continuously re-rank the tables included in the plurality of databases in order to redetermine, and as necessary reassign, if needed, memory locations based on the re-ranking.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

Figure 1:
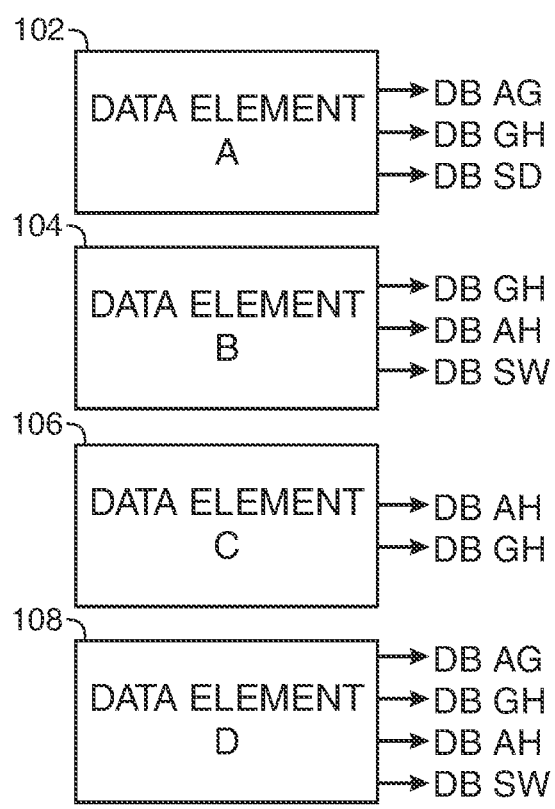
FIG. 1 shows an illustrative diagram in accordance with principles of the invention.

A centralized database identifier repository is provided. The repository may include a plurality of database identifiers. Each database identifier identifies a database included within a plurality of databases. The repository may also include a plurality of data elements. Each data element may be associated with data included in one or more of the plurality of databases.

The repository may also include a linkage between each data element and one or more database identifiers. Each of the one or more database identifiers may identify a linking database. The linking database may include data associated with the data element. The database may be included in the plurality of databases. An example may be a first data element that identifies a person named James Smith. Data pertaining to James Smith may be found in databases A, G and H. The repository may include the data element James Smith linked to database identifiers that identify databases A, G and H.

The repository may be operable to receive a request from a user. The request may include one or more data elements. The repository may be operable to respond to the user. The response may include the database identifiers associated with the received one or more data elements.

The repository may be operable to receive a request from a user. The request may include one or more data elements. The repository may be operable to determine one or more database identifiers associated with the request. The repository may be operable to transmit a second, or subsequent, request to each of the databases identified by the one or more database identifiers. The second, or subsequent, request may include the one or more data elements. The repository may receive the data, associated with the one or more data elements, from each of the databases. The repository may transmit the received data associated with the one or more data elements to the user.

In some embodiments, the request may include user entitlement data. The repository may determine whether a user identified by the user entitlement data is permitted to access the data from each of the databases prior to transmitting the received data to the user.

In some embodiments, based on a user's entitlement, there may be different levels of access to the data included in the databases. In one example, a user may be entitled to the knowledge of whether data in included in the database, however the user may not be entitled to view the data. In another example, a user may be entitled read access to the databases, however the user may not be able to retrieve the data. In another example, a user may be able to read and retrieve the data.

In some embodiments, the request may include a reason for the request. The repository may transmit the received data upon receipt of an acceptable reason for the request. An acceptable reason for a request may be a reason selected from a predefined list of acceptable reasons. An example of an acceptable reason may be performing a transaction associated with a person identified by a data element.

In some embodiments, a database identifier may include a communication link with the associated database. The database identifier may communicate between the centralized repository and the identified database in order to retrieve the data from the identified database.

In some embodiments, each database identifier is an encrypted token. Each token may be processed by a validation layer prior to communicating with an associated or underlying database. The validation may be based on the requestor's entitlements and/or the requestor's purpose for the data retrieval. Upon validation, the database identifier token may communicate with the underlying database to retrieve the requested data.

In some embodiments, the system may combine two or more tables or databases upon determining that the contents of the two or more tables or databases contains more than a predetermined amount of overlapping data.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows a centralized database identifier repository. The centralized database identifier repository may include a plurality of data elements, such as data element A, shown at 102, data element B, shown at 104, data element C, shown at 106 and data element D, shown at 108.

Each data element may be found in one or more databases of a system. In order to couple together the duplicate data elements found in each database, the repository may store the data element and each database location in which the data element is found. Such a repository may provide a centralized source to locate each data element.

Data element A, shown at 102, may be located in databases AG, GH and SD, identified by database identifiers DB AG, DB GH and DB SD. Data element B, shown at 104, may be located in databases GH, AH and SW, identified by database identifiers, DB GH, DB AH and DB SW. Data element C, shown at 106, may be located in databases AH and GH, identified by database identifiers DB AH and DB GH. Data element D, shown at 108, may be located in databases AG, GH, AH and SW, identified by database identifiers DB AG, DB GH, DB AH and DB SW.

Figure 2:
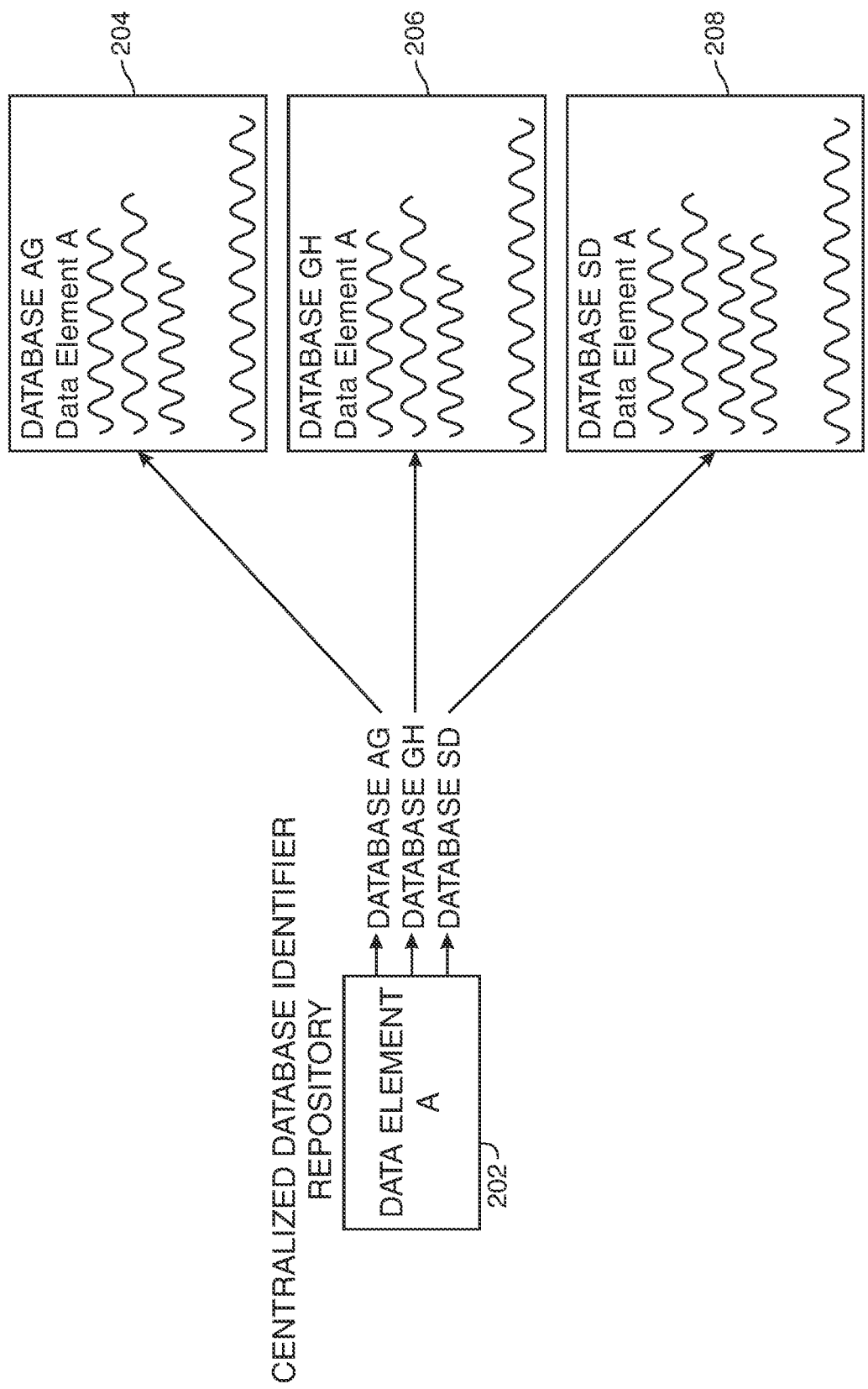
FIG. 2 shows another illustrative diagram in accordance with principles of the invention.

FIG. 2 shows a detailed view of data element A, shown in FIG. 1. Data element A, shown at 202, may be located in databases AG, GH and SD. Database AG, shown at 204, shows data element A with additional data about data element A. Database GH, shown at 206, shows data element A with additional data about data element A. Database SD, shown at 208, shows data element A with additional data about data element A. It should be appreciated that the data about data element A included in database AG, GH and SD, may be the same data, similar data or different data.

Figure 3:
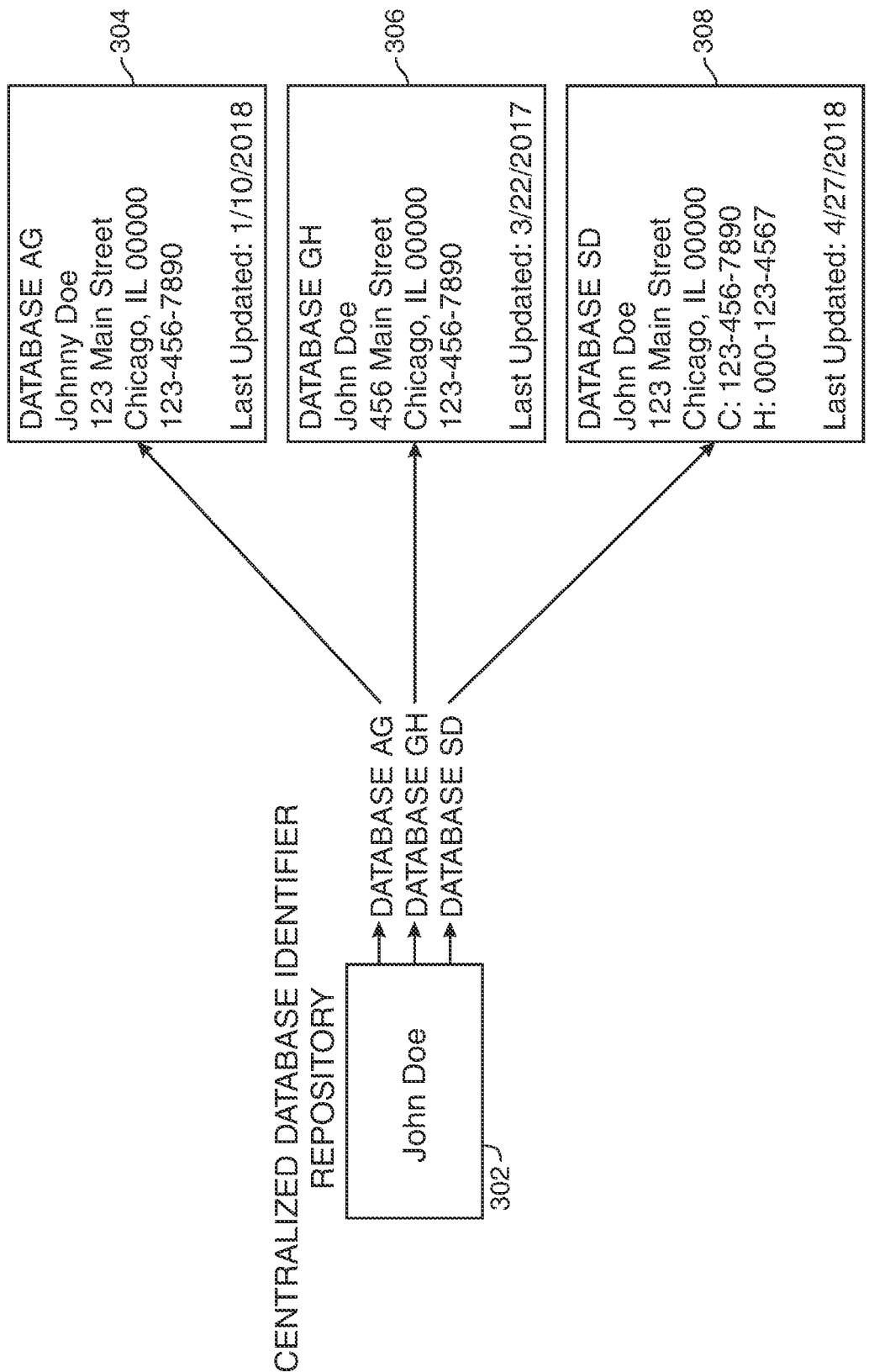
FIG. 3 shows yet another illustrative diagram in accordance with principles of the invention.

FIG. 3 shows a detailed view of an exemplary data element. Data element 302 may identify a fictional person named John Doe. Data element 302 may be included in a centralized database identifier repository. Data element 302 may be associated with databases AG, GH and SD. Databases AG, GH and SD may each include data relating to data element 302. Database AG may include a record relating to Johnny Doe, as shown at 304. Record 304 may include data relating to John Doe. Record 304 may include a name, street address, phone number and last updated time stamp. It should be appreciated that the name associated with record 304 (Johnny Doe) may be similar to data element 302 (John Doe). Even though the names may not be the same, the system may have identified record 304 and data element 302 to identify the same person.

Database GH, may include a record relating to John Doe, as shown at 306. Record 306 may include data relating to John Doe. Record 306 may include a name, street address, phone number and last updated timestamp.

Database SD, may include a record relating to John Doe, as shown at 308. Record 308 may include data relating to John Doe. Record 308 may include a name, street address, cell phone number, home phone number and last updated timestamp.

It should be appreciated that the street address on records 304 and 306 match, while the street on record 308 differs from records 304 and 306. It should also be appreciated that records 304 and 306 include one phone number and record 308 includes two phone numbers. Even though records 304, 306 and 308 are not identical, the system may determine that the records identify the same person. The determination may be made because the records include greater than a threshold percentage of identical data.

Figure 5:
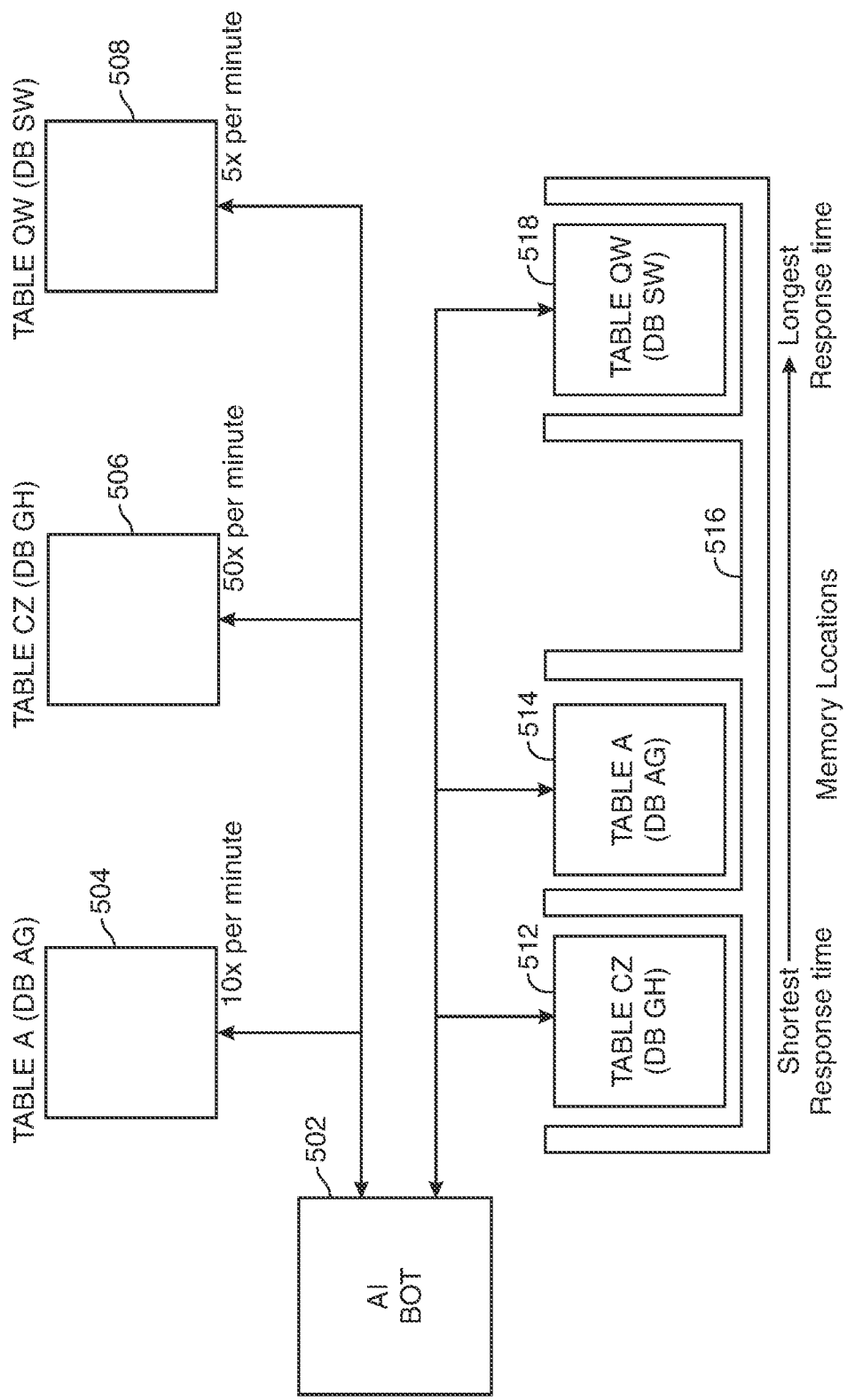
FIG. 5 shows an illustrative diagram in accordance with principles of the invention.

It should also be appreciated that an artificial intelligence bot, as shown in FIG. 5, may create, update and/or maintain the centralized database identifier repository. The artificial intelligence bot may crawl through multiple databases of a system in order to identify the same and similar records. The artificial intelligence bot may also identify data records that are out of date, records that can be archived and/or deactivated and/or improved by consolidation.

Figure 4:
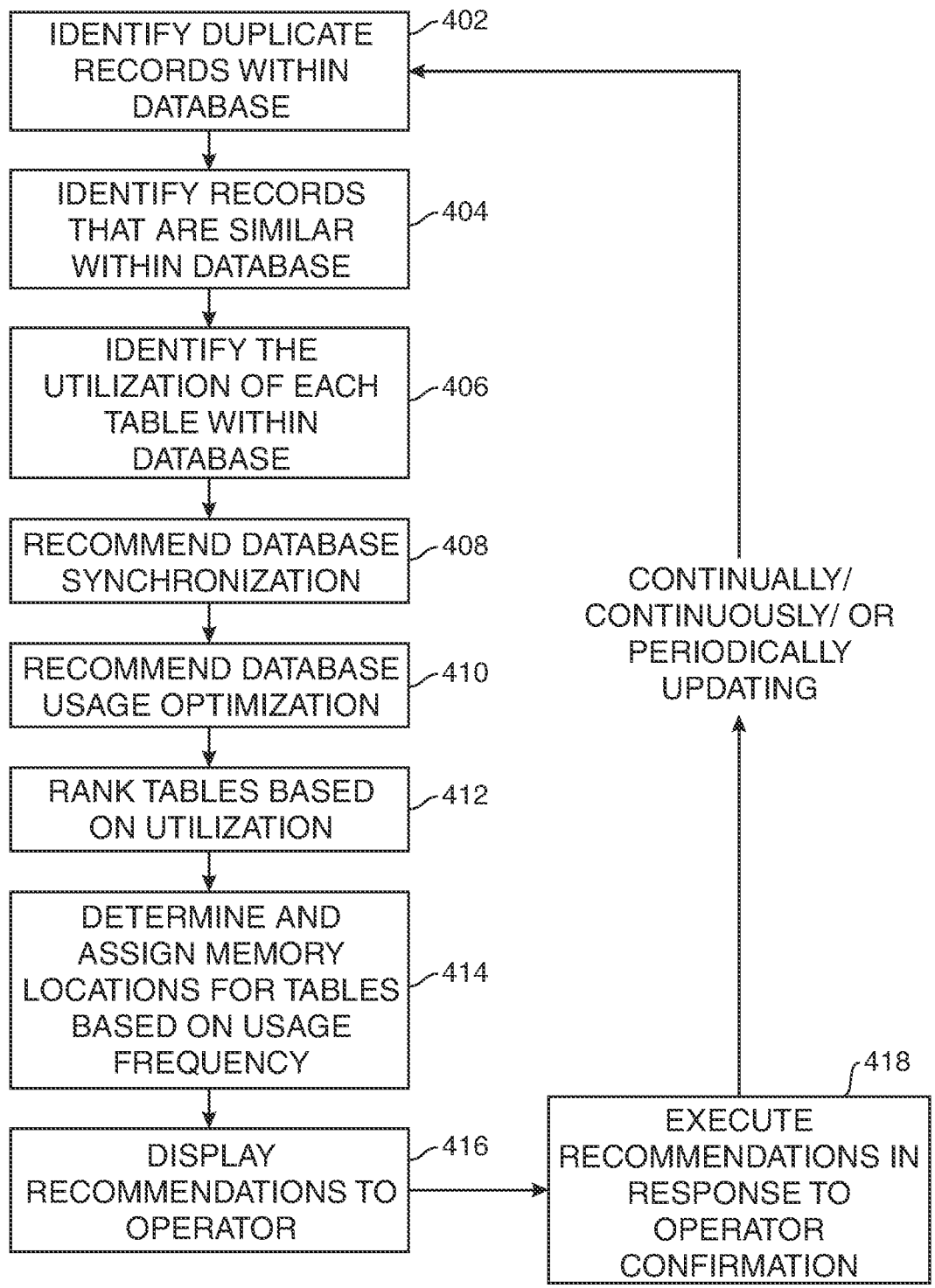
FIG. 4 shows an illustrative flow chart in accordance with principles of the invention.

FIG. 4 shows an illustrative flow chart. Step 402 shows identifying duplicate records within one or more databases. Step 404 shows identifying records that similar within one or more databases. Step 406 shows identifying the utilization of each table within one or more databases.

Steps 408 and 410 may be based on steps 402, 404 and 406. Step 408 shows recommending database synchronization. The recommending may be based on the identifying duplicate records, identifying similar records and identifying the utilization of each table within the database.

Step 412 may be based on step 406. Step 412 may include ranking tables based on utilization. Tables that are utilized more times per time period may be ranked higher than tables that are utilized fewer times per time period.

Step 414 may include determining and assigning memory location for tables based on usage frequency. Tables and/or databases that ranked higher may be assigned memory locations with a shorter response time than tables and/or databases that are ranked lower.

Step 416 shows displaying recommendations to operator. The recommendations may be displayed to an operator. At times, the recommendations may include displaying two similar records to an operator to identify which record is more accurate.

Step 418 shows executing recommendations in response to operator confirmation. In these embodiments, the system may execute the recommendations upon operator confirmation. In other embodiments, the system may execute recommendations that have been determined to be accurate at greater than a predetermined confidence threshold independent operator confirmation.

FIG. 5 shows an exemplary artificial intelligence ("AI") bot 502 placing database tables in various memory locations. Table A, included in database AG, shown at 504, may be accessed at a rate of 10× per minute. The access may be based on, or provided in response to, various requests including structure query language ("SQL") queries.

Table CZ, included in database GH, shown at 506, may be accessed at a rate of 50× per minute. Table QW, shown at 508, may be accessed at a rate of 5× per minute. AI bot 502 may have determined the access rate for each of tables 504, 506 and 508.

AI bot 502 may determine that table CZ is accessed at the highest rate. Therefore, table CZ may be placed into the memory location with the shortest response time, as shown at 512. AI bot 502 may determine that table A is accessed at the second to highest rate. Therefore, table A may be placed into the memory location with the second to highest response time, as shown at 514. It should be appreciated that memory location 516 may be vacant, because it may have been reserved or AI bot 502 may be waiting to place an appropriate table within memory location 516. AI bot 502 may determine that table QW is accessed at the slowest rate. Therefore, table QW may be placed into the memory location with the longest response time, as shown at 518.

Thus, an artificially-intelligent, continuously-updating centralized database identifier repository system is provided. Persons skilled in the art will appreciate that the present invention can be practiced by other than the described embodiments, which are presented for purposes of illustration rather than of limitation. The present invention is limited only by the claims that follow.

The invention claimed is:

1. A method for data consolidation of an artificially-intelligent centralized key data repository, the method comprising:
   reviewing a plurality of databases, each database included in the plurality of databases comprising one or more data elements;
   based on the reviewing, determining:
      duplicate data elements within the plurality of databases;
      comparable data elements within the plurality of databases;
      a utilization metric for each data element included within the plurality of databases;
   ranking the data elements included in the plurality of databases based on the utilization metric, wherein more frequently used data elements receive higher ranking and less frequently used data elements receive lower ranking;

determining and assigning memory locations for each data element, the memory locations including a plurality of memory locations with shorter than a threshold response time and a plurality of locations with greater than the threshold response time, wherein data elements with greater than a threshold frequency are assigned to memory locations with shorter than the threshold response time and data elements with lower than the threshold frequency are assigned to memory locations with greater than the threshold response time;

identifying one or more recommendations for database synchronization and/or database usage optimization;

displaying the recommendations to operator; and executing the recommendations upon receipt of operator confirmation.

2. The method of claim 1, further comprising:
re-reviewing the plurality of databases; and
identifying one or more recommendations after a predetermined time period.

3. The method of claim 1, further comprising:
re-ranking the data elements included in the plurality of databases; and
redetermining and reassigning memory locations based on the re-ranking.

4. The method of claim 1, further comprising:
deactivating data elements that are determined to be utilized less than a second threshold frequency.

5. The method of claim 1, further comprising archiving data elements that are determined to be utilized less than a second threshold frequency.

6. The method of claim 1, further comprising combining two or more data elements upon determining that the contents of the two or more data elements contains more than a predetermined amount of overlapping data.

7. The method of claim 1, further comprising combining two or more databases upon determining that the contents of the two or more databases contains more than a predetermined amount of overlapping data.

* * * * *